United States Patent [19]

Chamberlain et al.

[11] Patent Number: 4,721,566

[45] Date of Patent: Jan. 26, 1988

[54] TILTING PAN FILTERS AND CAM THEREFOR

[75] Inventors: Donald L. Chamberlain, Baton Rouge; Robert J. Sweeney, Gonzales, both of La.

[73] Assignee: Freeport Minerals Company, Belle Chasse, La.

[21] Appl. No.: 797,967

[22] Filed: Nov. 14, 1985

Related U.S. Application Data

[63] Continuation-in-part of Ser. No. 754,410, Jul. 12, 1985, Pat. No. 4,675,107.

[51] Int. Cl.$^4$ ............................................. B01D 35/08
[52] U.S. Cl. ..................................... 210/328; 210/330; 210/333.1; 210/344; 210/345
[58] Field of Search ....................... 210/106–108, 210/232, 328, 330, 333.1, 333.01, 344, 345, 347, 450, 479, 541

[56] References Cited

U.S. PATENT DOCUMENTS

| | | | |
|---|---|---|---|
| Re 24,150 | 5/1956 | Delrvelle | 210/385 |
| 1,028,789 | 6/1912 | Rothwell | 210/216 |
| 1,765,252 | 6/1930 | Vernay | 210/328 |
| 2,637,443 | 5/1953 | Schwartz | 210/328 |
| 2,853,193 | 9/1958 | Crumb | 210/328 |
| 3,139,404 | 6/1964 | Stock | 210/328 |
| 3,216,576 | 11/1965 | Roos | 210/328 |
| 3,327,866 | 6/1967 | Lyle Jr. et al. | 210/328 |
| 3,373,873 | 3/1968 | Parmentier | 210/328 |
| 3,389,800 | 6/1968 | Roos | 210/328 |
| 3,426,909 | 2/1969 | Garner | 210/328 |
| 3,537,589 | 11/1970 | Fratto et al. | 210/328 |
| 3,830,658 | 8/1974 | Davister | 210/328 |
| 3,966,610 | 6/1976 | Gibbs | 210/203 |
| 4,172,791 | 10/1979 | Davister | 210/328 |
| 4,330,404 | 5/1982 | Davister | 210/328 |
| 4,391,706 | 7/1983 | Steinkraus | 210/330 |
| 4,496,462 | 1/1985 | Steinkraus | 210/344 |
| 4,547,288 | 10/1985 | Little | 210/330 |

FOREIGN PATENT DOCUMENTS 238157  1/1964  Netherlands .................... 210/328

*Primary Examiner*—Peter Hruskoci
*Attorney, Agent, or Firm*—Fisher, Christen & Sabol

[57] ABSTRACT

Tilting filter pans is disclosed having generally parallel leading and trailing sidewalls which are sloped at an angle to permit increased filtration rates for a predetermined filtering efficiency, and also to permit increased filtering efficiency where the feed rate is constant. The feed is a slurry from which the liquid is removed, and the filter cake being dumped by rotation of each filter pan at a predetermined point of movement of the filter pan along a cyclical path. Hold-down devices having a reduced volume are also used in combination with the improved pan design, so that an increased filtration rate is possible due to decrease in the required filter cake height. A cam arrangement is provided for turning the pans with minimum stress in a minimum length of pan travel, while avoiding collisions between adjacent pans and while permitting washing of each pan.

20 Claims, 20 Drawing Figures

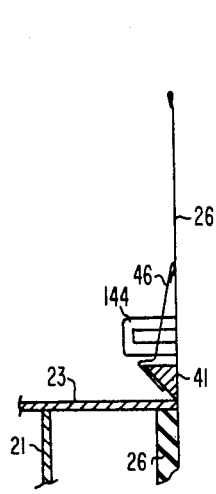
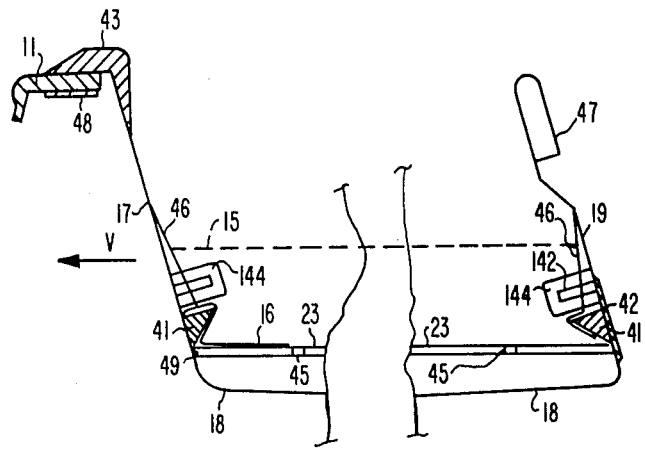
FIG. 11.
FIG. 10.
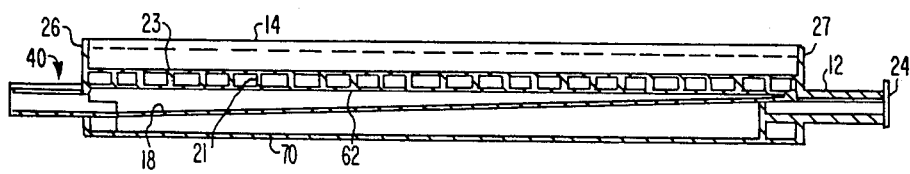
FIG. 12.

TILTING PAN FILTERS AND CAM THEREFOR

CONTINUING DATA

This application is a continuation-in-part of co-pending application U.S. Ser. No. 754,410, filed on July 12, 1985, now U.S. Pat. No. 4,675,107.

BACKGROUND OF THE INVENTION

This invention relates to tilting pan filters which travel in a continuous cyclical path and which are capable of rotating about an axis perpendicular to the direction of pan travel for discharge of filter cake. This invention is used for separating a slurry into particulate matter and liquid.

The invention particularly relates to tilting pan filters which are used in the wet-process phosphoric acid industry. The filter cake which is to be discharged is composed of gypsum. In the wet-process phosphoric acid plants it is to return some of the filtrate recovered during dewatering to rinse filter cake during various portions of the filtering cycle. The balance of the filter liquid represents product acid. The tilting pan filters of the present invention and shown in the prior art described hereunder are used for the countercurrent washing recovery of phosphoric acid from gypsum.

It is known in the art to use tilting pan devices for filtering particulate matter from liquid. The prior art pans are shaped such that there is a reduced possibility of collision, during a 180° rotation in a predetermined rotational direction, between adjacent pans, thereby simplifying design of guide cams necessary to control pan rotation.

In these prior art devices, liquid is supplied to consecutively cover a filtering surface of each pan, with a source of vacuum being connected to an opposite side of the filtering surface, to draw liquid therethrough. During each cycle, liquid is drawn through the filtering material leaving only the filter cake behind. Additional steps, such as washing using recycled liquid, are also known in the prior art.

The prior art filter pans as described above have several drawbacks. The prior art filtering pans have sidewalls opening outwardly along both the forward and the trailing edges, which arrangement does not provide either the maximum filtering area possible, or the maximum volume for filter cake, since the dead space between pans is not minimized. This prior art type of arrangement leads to inefficiencies due to lower liquid velocity through the filter cake, and to greater liquid viscosity losses. For a predetermined plant size, the prior art devices result in reduced filtration, or alternatively result in a lower quality of filtration efficiency (defined as the percentage of mother liquid removed from the filter cake).

Another drawback of the prior art devices is the splashing of feed liquid and wash liquid as they flow in a wave about the pan before losing the kinetic energy imparted during feeding. The sidewalls on prior art pans do not contain the liquid to the maximum extent possible, as they generally scope outward on both the forward and trailing edges. Liquid and slurry can fall between pans, reducing filtration rate and efficiency and increasing maintenance requirements.

A tilting motion is necessary in order to empty a filter pan of the filter cake at the end of each cycle. The outwardly-opening sidewalls of the prior art are thought to facilitate discharge of the filter cake.

It is a problem with prior art pans that they do not drain the filtered liquid out of the pan body rapidly, since the axis of the pan is the drain point. A pan whose filtering surface is close to the axis will not drain quickly as there can be little slope on the surfaces on which the liquid moves to the drain point. However, the pan may be in close proximity to its neighbor, as the radius of the circle on which the pan moves as it tilts is relatively small, reducing the potential filtration area wasted to prevent interference with the neighbor. A pan whose filtering surface is further away from its axis can be made to drain more quickly but the radius of the turning circle is larger, requiring more wasted area between pans to prevent interference. It is desirable for pans to drain quickly as this increases filtration rates, reduces product contamination with wash liquids, and improves filtration efficiency.

Furthermore, cloth filters are used over a liquid-pervious support bed as the filtering medium in the prior art. Hold-down devices are employed along the edges of pans, about which the cloth is wrapped. The hold-down devices are tensioned by tensioning devices mounted to the side and end walls of the pans. The hold-down devices of the prior art are relatively bulky and occupy a volume which causes the filter cake height to be increased for a given mass of filter cake. This increased cake height causes losses in filtering efficiency due to decreased fluid velocity caused by increased liquid viscosity frictional losses. It is therefore a problem with the prior art devices that hold-down devices having a relatively large volume are employed for tensioning the filtering cloth.

The prior art devices have the outwardly-sloping leading and trailing side walls in order to permit rotation of the filter pans about an axis which is generally transverse to the direction of travel of the filtering pan, the axis about which the filter pan tilts lying also in a plane parallel to the plane of the filtering material. The tilting motion is necessary in order to empty a filter pan of the filter cake at the end of each cycle. The outwardly-opening sidewalls of the prior art facilitate discharge of the filter cake.

The cam arrangements of the prior art are not capable of tilting and returning closely-spaced pans having a leading wall which is generally parallel to a trailing wall of an adjacent pan, due to interference between pans as each pan is rotated. The prior art cams do not optimize the cam to provide a minimum region of travel during tilting of each pan which avoids collisions, and which minimizes stresses on the pans.

It is therefore a problem in the art to efficiently use the maximum filtering surface available relative to the volume of space swept cyclically by the available filtering volume of each filter pan. It is also a problem in the prior art devices to permit tilting and rotating of each filter pan about a radial axis (relative to the path of travel) of the pan, to permit emptying of filter cake from each filter pan. It is also a problem in the prior art devices to permit tilting and rotating of each filter pan about a radial axis of the filter pan, to permit emptying of filter cake from each filter pan, without collisions and with minimum stress. Typical of the prior art filter pan devices are those discussed hereunder.

The Delruelle U.S. Pat. No. RE 24,150 shows a cam path arrangement explicitly in FIG. 13 of the Delruelle patent. The cam of Delruelle causes consecutive inversion of filter pans, shown in dotted outline. The pans are returned to an upright position at another cam location.

The Rothwell U.S. Pat. No. 1,028,789, shows a tilting pan as seen in FIG. 4 of Rothwell having outwardly sloping pan sidewalls. This is representative of the prior art, since the outwardly sloping sidewalls do not teach or suggest use of a parallelogram-like cross-sectional shape. A cam arrangement is shown in Rothwell in FIGS. 6 and 7.

The Gibbs patent, U.S. Pat. No. 3,966,610, is of interest for showing cams 46, 48 of Gibbs in FIG. 2 which support rollers 42, 44 for assisting in the tilting of the pan. This patent relates to the filtering process.

The Schwartz patent, U.S. Pat. No. 2,637,443, is also of interest for teaching, in FIG. 12 of Schwartz, a particular cam arrangement showing in dotted outline the path followed by the pair of moving rollers. by this cam arrangement, each filter pan is inverted consecutively.

The Davister U.S. Pat. No. 4,330,404 is an illustration of the typical prior art pans, their function, and their accessory equipment. It teaches use of multiple filter pans traveling through a circular arc in a horizontal plane, which are rotatable about a radial pan axis to discharge the filter cake by-product, which does not pass through the filter materials. The pan then returns to an upright position to receive more fluids to be filtered. Washing or rinsing cycles can be used to increase the efficiency and/or quality of the filtering process. Clearance is maintained between each of the tilting pans, to permit the rotation about the radial axis of each pan during discharge of filter cake.

In the patent to Steinkrause, U.S. Pat. No. 4,391,706, a filter element sealing device for a filter pan is shown in FIGS. 4 and 6 of Steinkrause. This device is of a resilient material and is generally L-shaped. It is held down by a hold-down arm which is held in place against a wall of the filter pan by a wedge.

In U.S. Pat. No. 3,830,658, to Davister, a method and device for washing a continuous filter is shown. This invention teaches cleaning of tilting filter pans wherein wash water is used to scour the filter material while the filter pan is inverted, the wash water being supplied between the bottom of the tilting filter pan and the filter material.

In U.S. Pat. No. 4,172,791, to Davister, a multiple cell filter having a gas discharge is taught. The gas discharge is shown in FIG. 8 of the '791 patent, and in FIG. 1 an entire schematic diagram of the liquid-removal system employing a vacuum is shown.

In the patent to Lyle, Jr., et al, U.S. Pat. No. 3,327,860, a tilting pan filter drain valve is shown. This valve is shown in FIG. 3, and provides a selectively openable drain in the filter pan.

In U.S. Pat. No. 3,389,800 to Roos, a tilting pan filter having a residual filtered liquid trap is shown. In another patent issued to Roos, U.S. Pat. No. 3,216,576, a filter pan structure is taught.

In U.S. Pat. No. 3,139,404, to Stock, a tilting filter pan device is shown having filter support structural details as well as a means for causing rotation of the tilting filter pans, namely rollers 50,52 in FIG. 1.

In U.S. Pat. No. 3,426,909 to Garner, a support grid for a filter pan is shown.

SUMMARY OF THE INVENTION

By the present invention, increased filter surface area in a tilting pan filter is achieved. Also, by use of the present cam arrangement, the ratio of pan travel during filtering, to pan travel during discharge-and-return operations, is maximized, with stresses on the parts being minimized while collisions between pans are avoided. That is, for a given volume swept by any of the tilting filter pans, available filter surface area is increased significantly, as compared to the prior art, without preventing the pan tilting which is necessary to discharge filter cake material. Available volume is also increased for the reception of the filter cake material.

Also by the present invention, filter cake height is decreased in each filter pan, by the inventive tilting filter pan shape which improves filtration rates and efficiency at any set of operating conditions, and by the filter media hold-down device.

Also by the present invention, the slope on the filter media surfaces which move filtered liquids to the pan drain point may be increased without as large a penalty in wasted area between pans as compared with the prior art. Filtration rate and efficiency are not penalized while product contamination with wash liquids is reduced significantly.

The inventive filter pan and hold-down apparatus combine to minimize cake thickness at any set of operating conditions, and to maximize filtration rates.

The inventive filter pan shape reduces fluid flow splashing from one pan to another, producing instead a "backwave" at the trailing sidewall to redirect the liquid back to the filter pan in which the liquid was originally poured, thus quickly dissipating fluid transverse kinetic energy.

The present invention involves an improved tilting pan design wherein the cross-sectional outline of each pan forms the general shape of a parallelogram. The tilting pans are generally arranged in an apparatus so as to have the shape of a circle, the segments being truncated at a region near the center of the circle to form a generally hollow interior space among them. This parallelogram-shaped pan cross-sectional outline has distinct advantages over the prior art pan shapes. First, this results in increased capacity in use in a pre-existing plant, since there is less wasted space between the pans at the surface of the filtering medium itself. This shape also does not prevent tilting of the pans to discharge the contents, as discussed hereunder. An alternative advantage of the use of the present invention is a better quality of filtration. The present inventive tilting pan yields reduced cake height, as well as increased area available for filtering, as compared to the prior art pans.

An advantage of increased capacity in a preexisting plant is the greater feed rate possible. In one example of the present invention, there would be theoretically an 8.4% increase in filtration capacity. This figure takes into account the inventive pan shape and the hold-down device used which takes up less volume than the hold-down devices of the prior art.

In the present invention, clearance between pans can be kept at approximately one inch or less along the height of the adjacent sidewalls, whereas in the prior art pans the minimum clearance might, for example, be one inch at the top of the pans and 3 to 4 inches at the bottom of the pans, due to the prior art pan shape, resulting in reduced filtering surface available at the bottom of the pans. Also, the inventive pans preferably have a sloped lower liquid collection surface to facilitate drainage of the filtered liquid. With the inventive pans the drainage slope may be greater without having to increase the area between pans to prevent interference during tilting.

Tilting of each pan is individually caused by two separate wheels mounted on arms connected to the pan shaft, the shaft supporting the tilting pan during rotation thereof. Each wheel extends at a different distance from the tilting pan end wall. Thus, each wheel can follow a separate cam path which causes timed tilting of each individual pan both to empty the pan filter and to move adjacent pans in timed relationship to avoid collisions, as necessary.

The rotation axis of each pan does not underlie the gravitional center of the pan. The trailing edge is heavier than the leading edge due to the weight of the pan itself and the cake thereon, which facilitates tilting of the pans since the initial tilting motion is performed by gravity. When returning the pan to its original position, much less energy is expended since the pan is then empty and there is less weight and less rotational inertia to be overcome. In the present design, the trailing edge rotates downwardly through approximately 180° and returns back to its upright position in a reversed rotational direction, thereby preventing twisting of connecting hoses by more than 180°, the connecting hoses being used to provide suction and to drain the fluid which is filtered; and to provide positive pressure (using pressurized air instead of suction) to aid the discharge of the cake.

A specific liquid and particulate material have been successfully used in the present invention. In particular, a pumped slurry is supplied to each filter, generally containing phosphoric acid with entrained gypsum as a by-product. The present invention is not limited thereto, and use with other materials and liquids is contemplated as being within the scope of the present invention. Each tilting pan filter has a cloth overlying a perforated plate to support the cloth, a vacuum system for drawing liquid through the filter, and hold-down device for maintaining tension in the cloth to keep the cloth stretched. Even though the trailing side wall of each individual tilting filter pan is angled inwardly, and thus tends to overlie a portion of the filter cake, discharge of the filter cake is not inhibited. Thus, the present invention achieves the result of the prior art filter pans, namely the complete discharge of filter cake at the end of each cycle, while increasing maximum filtration capacity. In the prior art devices and in the present invention, washing liquid is applied to the filter surface while the filter pan is inverted in order to clean the entire filter surface area.

There are several critical points for designing the cam, which set constraints upon the cam shape. In between these critical points, the cam design was optimized to provide minimum stress throughout the turning operation. As a result, a relatively constant stress occurs in the interval between each of the critical cam points, so that tipover and return to an upright position occurs for each filter pan within a minimum of arc of travel about the center of the apparatus. First the pan must be rotated approximately 180° in order to discharge the cake. Second washing of the pan occurs. The washing step is important, with a spray directed upwardly into the upside down filter pans to clean them out.

Due to adjacent filter pans being tilted, an additional critical point occurs where the filter pan being washed must be rotated slightly in a return directional rotation to avoid collision with the leading pan which is being returned to its upright position. The pan being washed is then rotated downwardly again to bring its trailing edge as close as possible to the spray wash, this rotation being limited by the presence of the trailing pan which is also being tilted. Once the pan has been washed, this leads to another critical point, at which the pan being washed must begin to be returned, to the upright position. The critical point chosen limits how close the tilting pan, being washed, can come to the spray nozzle head, to avoid collisions with adjacent pans as they tilt.

Further details and advantages of the present invention appear from the following description of a preferred embodiment shown schematically in the drawings.

BRIEF DESCRIPTION OF THE DRAWINGS

FIG. 10 is a cross-sectional view, with a middle portion broken away, of the filter pan as taken along line 10—10 of FIG. 5;

FIG. 11 is a cross-sectional view showing an end wall and hold-down device as taken along line 11—11 of FIG. 5;

FIG. 12 is a longitudinal cross-sectional view of the filter pan of the present invention as taken along line 12—12 of FIG. 5;

DETAILED DESCRIPTION OF THE INVENTION

Figure 1:
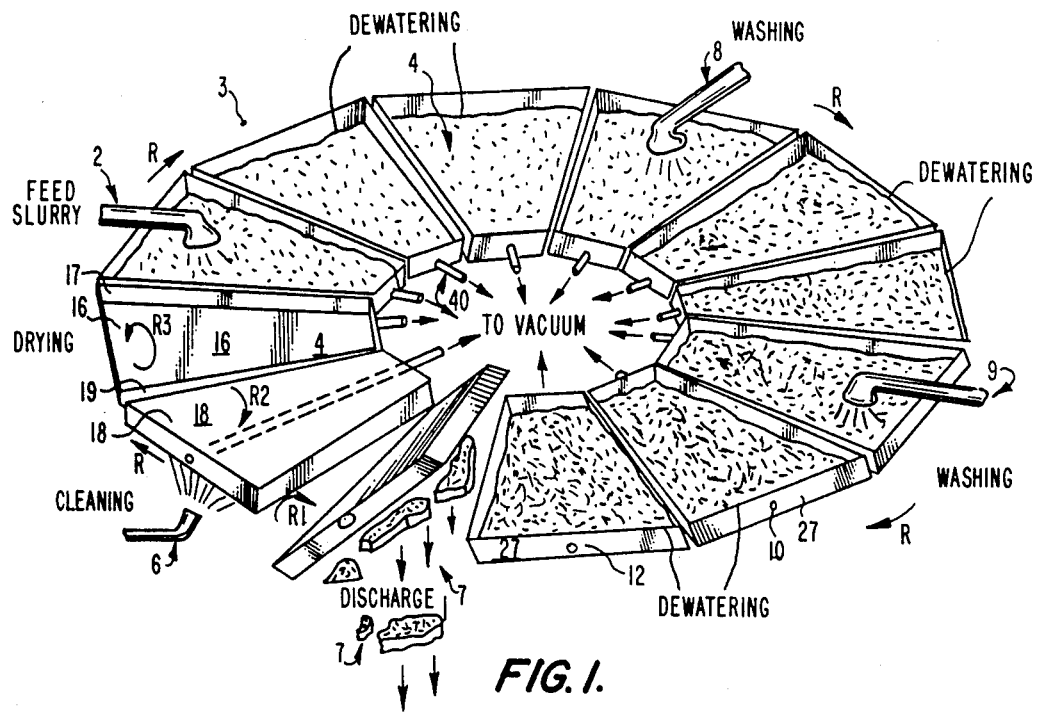
FIG. 1 is a diagramatic perspective view of a rotating assembly of tilting filter pans.

FIG. 1 is a diagramatic perspective view of a rotating filter pan device with individual tilting pans 3 being brought cyclically into various stations. As seen in FIG. 1, a feed slurry supply 2 provides a slurry to each individual filter 3, the slurry generally containing phosphoric acid with entrained gypsum as a by-product. Each pan 3 has a filtering medium 16 therein, atop which the slurry initially rests. A discharge conduit 40 is connected with a source of vacuum to rapidly draw the liquid portion of the slurry through the filtering medium. This is called "dewatering".

Upon dewatering, a filter cake 4 remains in the filter pan. The filtering efficiency and the nature of the slurry substantially determine the amount of time required for substantial dewatering of the filter cake 4. The pans cycle at a rotational velocity R, as indicated by the arrows in FIG. 1. The rotational velocity R, expressed in units of degrees per second, or radians per second, determines the amount of time each filter pan 3 spends in passing from one station to the next. The amount of slurry filtered is dependent upon the feed rate from the feed slurry supply 2, which in turn must be limited by the capacity of the tilting filter pan system.

A washing supply conduit 8 is shown in FIG. 1, which recycles liquid that has been drawn off during a dewatering portion of the cycle to further reduce the amount of acid entrained in the filter cake and to control the solids and acid concentration in the slurry feed stream. This washing step is followed by dewatering. Another washing step can be provided, as indicated by washing supply conduit 9. This would also be followed by a dewatering step. Each filter pan undergoes filtering steps, and may also undergo, if desired, additional washing steps, special treatments of varying kinds, and drying steps.

After the final dewatering stage, the filter cake 4 is removed by inversion of each filter pan 3. The falling, discharged filter cake is indicated as filter cake discharge 7, as shown in FIG. 1. The discharge operation takes place under the influence of gravity and a positive air pressure supply to the conduit 40. The rotation of the individual filter pan is indicated in FIG. 1 as R1, and rotates about an axis which in FIG. 1 would be a radius of a circle defined by the travel of the filter pans 3.

Rotation continues until the filter pan 3 is almost completely inverted, as indicated by the continued rotation R2. All of the discharge 7 is removed from the pan 3, first by gravity then by a cloth blow segment, and then by a cleaning spray 6. The cloth blow segment of travel uses positive air pressure to discharge the remaining filter cake, as is known in the art. The cleaning spray removes all of the filter cake 4 and washes the filtering medium. The filter pan 3 then rotates back to an upright position as indicated by arrow R3. Thus, an initial rotation of approximately 180° occurs in a first rotary direction for discharge, and then the pan is returned to its upright position by retracing the original rotation, as indicated by the arrows in FIG. 1. The cycle then starts anew as the filter pan passes beneath the feed slurry supply 2.

As seen in FIG. 1, shafts 10 are shown which are connections for members which are acted upon to cause rotation of the individual filter pans. This structure is shown in the succeeding figures. Also in FIG. 1 is seen the filtering medium surface 16 which is clean. The inventive shape of the individual tilting filter pans is evident in FIG. 1, and is shown in detail in the following figures.

Figure 2:
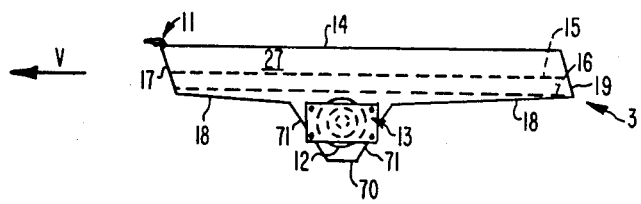
FIG. 2 is an end elevational view of an individual tilting filter pan.

FIG. 2 is an end elevational view of a tilting filter pan 3 according to the present invention. As seen in FIG. 2, the tilting filter pan 3 has a leading sidewall 17 and a trailing sidewall 19. The sidewalls 17 and 19 are generally parallel to one another, and are disposed, preferably, at a 15° angle to the vertical. The particular angle chosen is determined by considering the radius of the circle transcribed by the trailing edge of the pan as it tilts and the clearances desired with the following pan. The tilting filter pan 3 has top wall edges 14 and a bottom pan wall 18. A hollow shaft 12 is seen in section in FIG. 2, and a face plate 13 is seen which mounts the tilt arm to the shaft 12.

Figure 5:
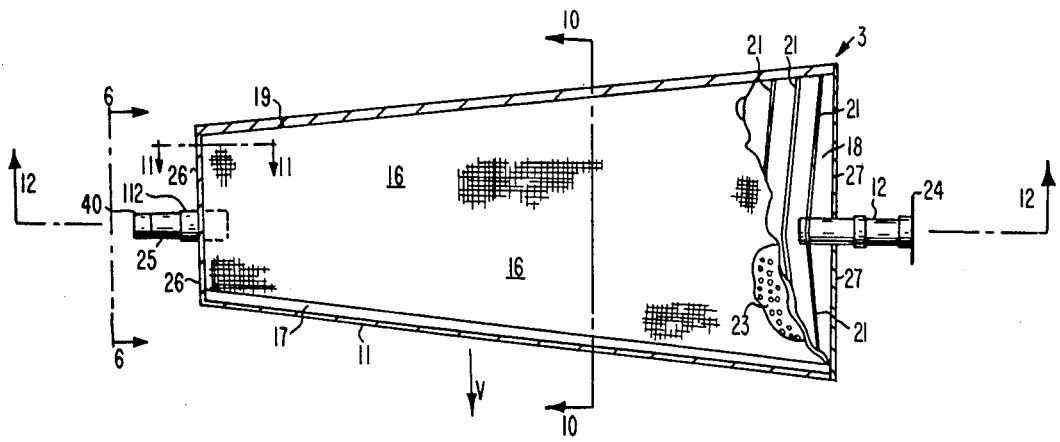
FIG. 5 is a top elevational view, partially broken away, of a tilting filter pan according to the present invention.

The filtering medium 16 is seen in dotted outline in FIG. 2. The filtering medium 16 is preferably a cloth sheet composed of a fabric suitable for filtering. Such filtering mediums are well known in the art. The fabric sheet is supported by a liquid-permeable member, known in the art, for supporting the filtering medium 16. The support is shown in FIG. 5 as perforated plate 23. A typical maximum filter cake height 15 is indicated in dotted outline in FIG. 2. Also as seen in FIG. 2, a "shroud" 11, attached to sidewall 17, is provided for preventing spillage of feed slurry between any two adjacent filter pans 3. The shroud 11 overlaps the gap between adjacent filter pans.

The filter pan 3 of the present invention is preferably formed of metal such as stainless steel, steel, aluminum, or the like, or of reinforced plastic, composite plastic materials, or any other materials sufficiently strong for supporting a filtering medium for filtering. Also, any filtering medium 16 can be used which is known in the art, instead of the fabric having a planar support of the present invention. All such variations are contemplated as being within the scope of the present invention.

As seen in FIG. 2, the filter pan 3 has an instantaneous linear velocity V. The magnitude of this velocity V can be determined from the rotational velocity R, by multiplying the rotational velocity R by the linear distance from the center of the circle about which during its travel from one station to another in the cycle shown in FIG. 1.

Typical apparatus dimensions are described hereunder for purposes of illustration only. Any variation in size, proportions, and scale are contemplated as being within the scope of the present invention. The pans 3 travel about a circular path having a radius at the outermost pan end in a range of approximately 350 to 386 inches. The pan width at the filter medium 16 at the pan end 27 shown in FIG. 2 is approximately 74¼ inches. The pan depth from the top pan edge 14 to the filtering medium surface 16, as seen in FIG. 2, is approximately 8 inches. The shafts 12 of adjacent pans, at the large pan ends, are spaced on centers at a distance of approximately 75 11/16 inches. The distance, as seen in FIG. 2, from the vertical centerline of the shaft 12 to the left-most edge of the filtering medium 16 is approximately 32¾ inches. The distance, as seen in FIG. 2, from the vertical centerline of the shaft 12 to the right-most edge of the filtering medium 16 is approximately 41¾ inches. The distance, as seen in FIG. 2, from the horizontal centerline of the shaft 12 to the plane of the filtering medium 16 is approximately 6⅛ inches.

Figure 3:
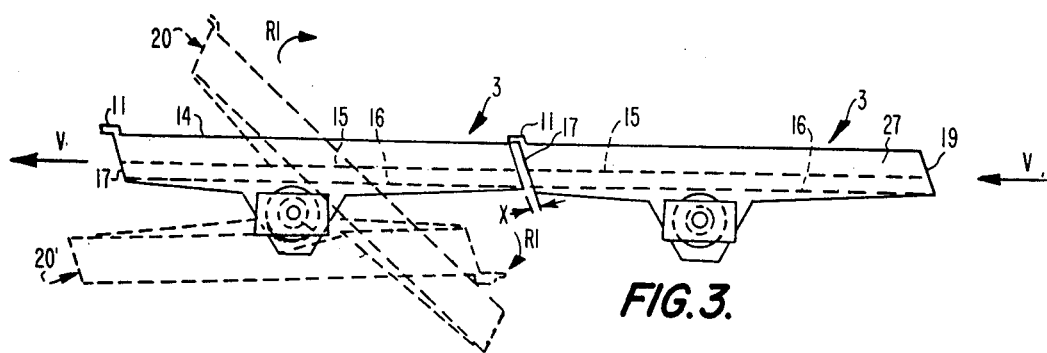
FIG. 3 is an end elevational view of a pair of tilting filter pans showing rotating of one of the tilting filter pans about an axis.

FIG. 3 is an end elevational view of adjacent tilting filter pans as used in the system of FIG. 1. These ends also move with an instantaneous linear velocity V, as described above with reference to FIG. 2. The gap between adjacent filter pans is indicated as X in FIG. 3. The gap X is generally constant from the upper-most edge 14 of the adjacent sides 19, 17 of the filter pans 3, along the respective sidewalls 19, 17, to the lower-most edges of the respective sidewalls. The gap varies along the length of the adjacent sidewalls 19, 17. This gap can be made almost arbitrarily small if the adjacent filter pans are precisely manufactured. In the preferred embodiment, the gap X at the large pan end is approximately 1½ inches in magnitude at the large pan end, and 2½ inches in magnitude at the small pan end.

The rotation of the leading filter pan 3 is indicted in dotted outline in FIG. 3. As seen, the tilting filter pan rotates in a direction R1 as indicated at 20 under its own weight. That is, the center of gravity of the tilting filter pan 3 does not directly overlie the center of the shaft 12, but rather lies to the right of a vertical line containing the center of the shaft 12, the direction taken from FIG. 3. Thus, gravity causes the rotation R1 to the position 20 shown in FIG. 3. The rotation R1 continues under the influence of gravity and also under the action of an external rotating means, conventional in the art, such as a cam arrangement or the like, until the filter pan 3 is completely inverted in a position 20', which position is also shown in dotted outline in FIG. 3.

Due to the parallelogram-shaped cross-sectional outline of each tilting filter pan 3, which approximates the rotational path of the pan extremities, it is possible to space the adjacent filter pans 3 relatively closely together over the whole height of the sidewall without risk of damage to adjacent filter pans during rotation. The bottom wall 70 beneath the shaft 12 has sidewalls 17, 17 as seen in FIG. 3 which provide structural support and which contain a fluid drainage area shown in subsequent FIG. 12.

Figure 3A:
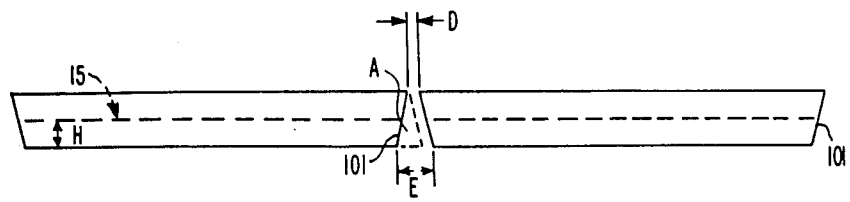
FIG. 3A is an end elevational view of a pair of prior art pans, showing in dotted outline the additional volume provided by the present invention.

FIG. 3A is an end elevational view of a pair of prior art tilting filter pans which are conventionally used. In these types of pans, due to the shapes of the adjacent pans, a distance D of approximately one inch or more separates the top edges of the pair of prior art filter pans, whereas a much larger distance E separates the bottom-most edges of the tilting filter pans. The distance E is typically three to four inches. The sidewalls in the prior art pans are angled outwardly, in at least one example at an angle of approximately 13°. This results in a waste of an area indicated in FIG. 3A as an area A bounded by the solid sidewall 101 and the dotted lines. This area A shown in FIG. 3A represents the volume available with the present pan design which is not available in the prior art. Thus, in the present invention, the cake height is reduced, and the filtering area is increased in the filter pan of the present invention, as indicated by the area A, over the prior art. The filter cake height also affects the filtering efficiency and filtering capacity.

Thus, as seen in FIG. 3A, there is a relatively large increase in volume available for a cake height H as seen in FIG. 3A, which is available in the present invention (but not in the prior art pans) for filling by the filter cake 4. This additional volume available for filling, which is disproportionately greater at the bottom of the area A than at the top, reduces filter cake height H required for a given mass of filter cake 4. This is also highly desirable since it contributes to reduced cake height.

Filtration capacity and filtration efficiency are both affected by filter cake height H. By the present invention, cake height H is decreased for a predetermined mass of filter cake in each pan, thereby increasing filtration efficiency. Alternatively, where increased filtration capacity is desired, the present invention permits such increased capacity without a corresponding increase in cake height H, thus permitting for example an existing plant to filter an increased amount of feed slurry 2 as compared with a prior art filter pan design. By the present invention, cake height is minimized and filtration rates are maximized, under any set of operating conditions.

Figure 4:
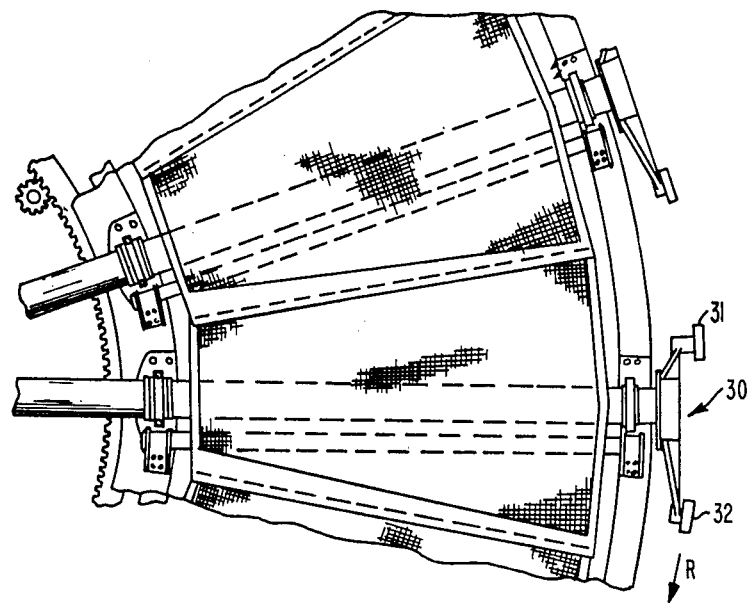
FIG. 4 is a top elevational view of a prior art tilting filter pan including a mechanism for rotating the tilting filter pan about an axis.

FIG. 4 depicts a prior art type of filter pan having a means 30 for rotating the tilting filter pans. The means 30 has rollers 31, 32 disposed at opposite ends of lever arms. The rollers 31, 32 contact cam paths which control the amount of the tilting and rotational direction thereof, of each individual filter pan. The filter pans are much heavier when they are full of filter cake, and are therefore much more difficult to turn. Thus, the center of gravity of the individual filter pans is offset toward the trailing edge somewhat, so that gravity causes turning in the rotational direction R1 as the filter pans fill up with filter cake 4. Thus, while the pan is empty a cam member, for example, would contact the roller 32 to prevent tilting of the filter pan under its own weight. This force would be relatively slight, compared with the force involved when the filter pan is full of filter cake 4. This arrangement takes advantage of the fact that a return means, such as cams and rollers, are required to return the filter pan to its upright position once it is empty. When empty, the filter pan requires much less energy and much less force upon the rollers 31, 32 in order to return the filter pan to its upright position.

The filtration capacity and filtration efficiency can be calculated theoretically from known principles and can be compared for the prior art pans and the present inventive pan. The present inventive pan has a theoretical filtration capacity increase of approximately 8.4% as compared to the prior art pans shown in FIG. 4. An equation used to calculate pressure differential across the filter cake is: delta$-P=(32 L (mu) u)/(gD^2)$. This formula, well-known in the fluid mechanical arts, indicates that for a given driving force, the filtration rate increases as the height of the cake decreases.

FIG. 5 is a top elevational view of an individual filter pan according to the present invention. The shaft 12 is seen through a cut-away portion of the filter surface 16 and support surface 23. Absent from FIG. 5 is support member 62 (shown in FIG. 12), which is not visible in FIG. 5 since it underlies surface 23 and plate 18. Support member 62 can be any structural member such as a strut, a perforated wall, or other stabilizing member. Support member 62 can be omitted if desired. Ribs 21 support the relatively thin support surface 23 for structural stability. Holes formed in the support surface 23 can be used to permit passage of liquid there-through. An end flange 24 is seen attached to the conduit 12, and the lower surface 18 of the filter pan 3 is seen in elevation in FIG. 5.

The conduit 40 has a first enlarged portion 25 and a second enlarged portion 112 as seen in FIG. 5. The conduit 40 is connected to a region of reduced pressure, which is at less than atmospheric pressure, to cause a pressure difference to exist between the top of the filter surface 16 and the underside of the support surface 23 so that increased liquid flow results. The interior side of the sloped wall 17 is visible in FIG. 5, while the exterior side of the sloped sidewall 19 is visible in FIG. 5. The left and right end walls 26, 27 respectively are shown in FIG. 5. The shroud 11 is seen on the leading edge 17 of FIG. 5. The velocity V of the filter pan 3 of FIG. 5 is indicated by the arrow in FIG. 5.

Figure 6:
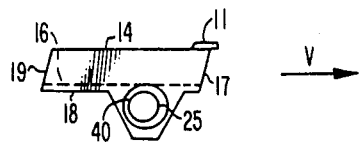
FIG. 6 is an end elevational view of the tilting filter pan as taken along line 6—6 of FIG. 5.

FIG. 6 is an end elevational view of the small end wall 26 as seen along line 6—6 of FIG. 5. Here, the shroud 11, and upstanding sloped sidewalls 17, 19 are seen. The direction of travel of the small end 26 is indicated by the arrow labeled v. The conduit 40 is seen as having a circular outline in FIG. 6. The filter surface 16 is indicated in dotted outline in FIG. 6.

Figure 7:
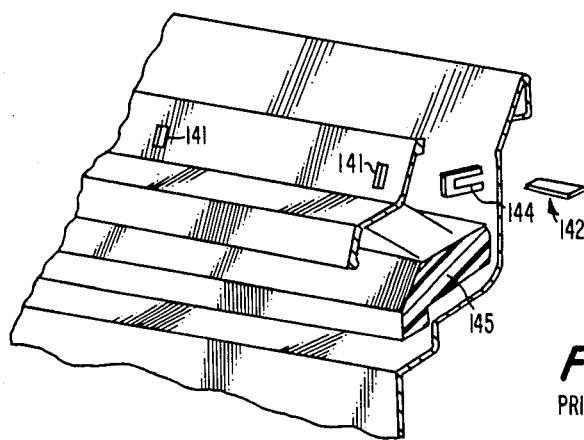
FIG. 7 is a perspective view of a prior art hold-down device.

FIG. 7 is a perspective view of a hold-down device used in the prior art. In this figure, openings 141 receive a projecting member (144) therein, with a wedge member 142 being inserted through the projecting member once it has passed through the openings 141. The assembly of the parts in FIG. 7 is indicated by assembly lines in the figure. A resilient member 145 is seen in the figure, for holding a cloth or fabric filtering medium stretched across the filter pan bottom.

Figure 8:
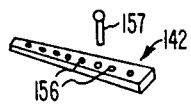
FIG. 8 is a perspective view of a wedge and pin used in the prior art hold-down device of FIG. 7.

FIG. 8 is a perspective view of the wedge member 142 of the prior art. In the type of wedge member, openings 156 are adapted to receive a pin 157 for retaining the wedge member 142 in place.

Figure 9:
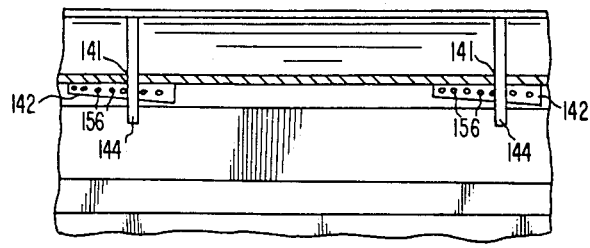
FIG. 9 is an elevational view of the prior art device shown in FIG. 7 as assembled with the wedge of FIG. 8.

FIG. 9 is a view of the apparatus of FIG. 7 and 8 as assembled together, as seen from a vertical position. The projecting members 144 are shown as passing through the openings 141, whereby the wedge members 142 are driven in place for a tight and secure fit, which tends to compress the resilient member 145.

The prior art hold-down member occupies a relatively large volume as compared to that of the present invention. This relatively large volume is undesirable since the large volume occupied causes a reduction in filtration capacity and filtration efficiency due to increased cake height, as discussed above. FIG. 10 shows the hold-down device of the present invention, wherein elongated triangular insert members 41 are used instead of the L-shaped insert members 145 of the prior art. The elongated members 41 can run the length of each pan sidewall and end wall, if desired, or smaller lengths can be used.

FIG. 10 is a cross-sectional view of the filter pan 3 as taken along line 10—10 of FIG. 5. An arrow V indicates the direction of travel of the filter pan. In FIG. 10, the filter cloth 16 is shown as wrapping around the insert member 41. The cloth 16 is broken away in FIG. 10 to avoid cluttering the figure, and extends to the other hold-down devices as well. The liquid-pervious support wall 23 is seen in FIG. 10 as having holes 45 therein. Arms or holddown plates 46 are seen adjacent to, and attached to, respective sidewalls 17, 19. The arms 46 are attached along their upper-most ends to the respective sidewalls 17, 19 by wedging, as seen in FIGS. 7–9. They may also be connected as by bolts, rivets, or the like. The shroud 11 is seen in cross-sectional outline in FIG. 10, with a support member 48 attached thereunder and a vertical rib 43 for structural strength of the sidewall 17. The trailing sidewall 19 is curved into a closed path 47 for structural integrity.

The structural details of the tilting pan 3 are as follows. A ¼ inch support plate 23 is used to support a filter cloth 16 stretched above it, the support plate 23 being supported by a metal grid having ribs 21 spaced approximately six inches apart to hold the support plate up. The support plate 23 has a plurality of holes therein to permit drainage of fluid through the filter cloth 16. The fabric 16 is stretched by using a triangular wedge 41 under a hold-down member 46, the hold-down member 46 being preferably tensioned by use of a wedge member 142 driven into a projecting metal loop 144. The loop 144 is preferably metal, which is welded to the respective sidewall. However, any number of other hold-down devices could be used within the scope of the present invention. The loops 144 used are welded at an approximately twenty inch spacing.

The Steinkrause patent, U.S. Pat. No. 4,391,706, is discussed hereinabove for showing a particular hold-down device as seen in FIGS. 7-9 which employ a similar loop and wedge. The prior art rubber member has a generally L-shaped profile as seen in FIG. 7, and takes up more volume than does the triangular hold-down member of the present invention. Thus, the prior art rubber member takes up filtration volume and it increases the cake height. Such increase in the cake height decreases filter efficiency, as explained hereinabove, and therefore the generally triangular cross-sectional shape hold-down member 41 of the present invention permits a decrease in the cake height compared to the prior art hold-down device, for any operating conditions.

The height of the sidewall 19 and the lip 47 are not drawn to scale in FIG. 10 relative to the sidewall 17. The sidewall 17 is sufficiently high so that the lower-most portion of support member 48 lies just atop the upper-most portion of the lip 47 of an adjacent filter pan 3.

FIG. 11 is a side view, partially in section, showing the end wall 26 and a projecting loop member 144 attached thereto, as taken along line 11—11 of FIG. 5. Support members 21 are visible for supporting the plate 23 as seen in FIG. 11. Another insert member 41 is seen in FIG. 11, having the same cross-sectional shape as those used for the sidewalls.

The end wall 26 is vertical relative to the member 23, as seen in FIG. 11. The end wall 27, not shown in FIG. 11, is also vertical and also has projecting members 144 for anchoring an insert member 41 so as to stretch the fabric 16 to the end walls. As discussed hereinabove with reference to the preceding figures, the fabric 16 is tensioned to the sidewalls as well as to the end walls.

FIG. 12 is a cross-sectional view of the filter pan 3 according to the present invention, as taken along line 12—12 of FIG. 5. Here, the trough or sloped bottom wall 18 is clearly seen in outline as sloping toward the conduit 40. This sloping increases fluid flow as compared to a completely horizontal wall. This increased slope improves drainage and facilitates efficient filtration. The lower-most wall 70 is seen in cross section in FIG. 12 as being completely horizontal. The termination point of the shaft 12 is seen in FIG. 12. Also, the upstanding end walls 26, 27 are seen in this figure. Also as seen in FIG. 12, the individual ribs 21 are sandwiched between the plate 23 and another plate 18 which underlies the plate 23 in FIG. 12.

Figure 13:
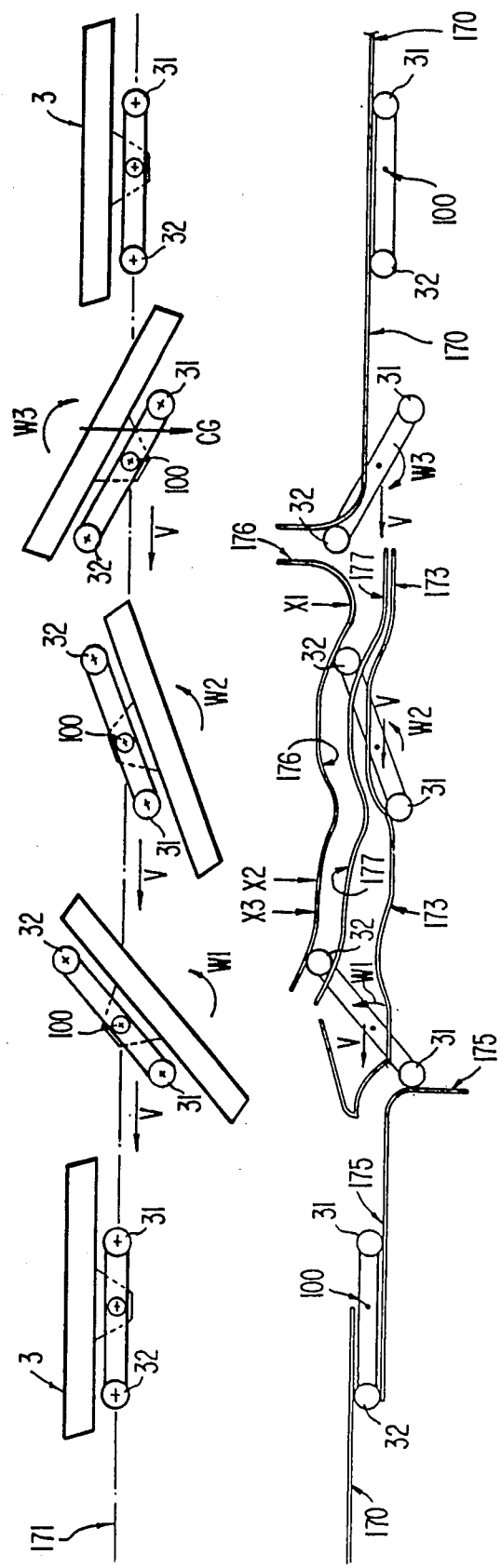
FIG. 13 is a schematic end view of a cam and consecutive pans during rotation by the cam.

FIG. 13 is a schematic end elevational view of several tilting filter pans in varying degrees of rotation. Directly beneath the pans is a schematic illustration of a cam arrangement together with pan rollers adapted to contact the cams. The cam rollers and cam arrangement are depicted directly beneath the respective tilting filter pans, so that both the cam arrangment and the resultant effect of the cam arrangement upon pans at a particular location along the cam path, are shown clearly.

The tilting filter pans 3 each have an axis of rotation 100. Each pan axis 100 travels along a line 171 with a velocity V. The cam arrangement shown in FIG. 13 is not actually planar in operation, but rather is curved with a radius at the center of the circle about which the pans 3 travel. The circle radial dimensions and the cam relative dimensions are dicussed with reference to FIG. 18 hereunder, as well as FIG. 19 hereunder, with the pans and cam arrangement being drawn approximately to scale in FIGS. 13-19.

Each tilting filter pan 3 has a leading roller 32 adapted to contact a cam surface, and a trailing roller 31 adapted to contacting a cam surface. The terms "leading" and "trailing" refer to the relative orientations of the rollers 32,31 respectively when the pan 3 is an upright position. The upright position is maintained approximately 90% of the time, with the pan being rotated and inverted during a portion of the pan travel equal to approximately 10% of the total pan travel time. This assumes that the velocity V of the pans is approximately constant and equal for all pans. The ratios are based upon distance traveled by the axis of rotation 100 of each pan.

As seen in FIG. 13, the axis of rotation of each of the pans 3 lies along a single line of travel 171. The right-most pan 3 and the left-most pan 3 are in upright positions. The intermediate 3 pans are not only rotated from an upright position but are also rotating with an angular acceleration and an angular velocity.

As seen in FIG. 13, the center of gravity is offset to the right of the axis of rotation 100, and is indicated in the right-most tilted pan as CG, indicated by a downward arrow in FIG. 13. The offset of the center of gravity somewhat to the right of the axis of rotation 100 generates a moment arm about the axis of rotation 100 tending to cause a rotation as indicated by the arrow W3 in FIG. 13. This moment arm requires a compensating force to be exerted in an opposite rotational direction, and this is accomplished by the main cam surface 170 during the portion of travel of each pan 3 during which the pan is completely upright. The leading roller 32 bears against the cam surface 170 with a force sufficient to counteract the moment arm of the center of gravity about the axis 100. The roller 31 actually undergoes no force during the portion of travel of the pans 3 during which the pans 3 are in an upright condition.

As seen in FIG. 13, the right-most tilted pan has an angular rotational velocity W3 due to the tilting of the pan 3. The tilting occurs as the center of gravity causes the lead roller 32 to follow the cam surface 170 upwardly, with the trailing roller 31 dropping downwardly. The middle tilted pan in FIG. 13 is undergoing a rotational velocity W2 as measured instantaneously during cam path travel. In FIG. 13, this middle tilted pan has a tilt which is controlled by the contact of the roller 32 with the cam surface 176 or cam surface 177, the cam surfaces 176,177 being closely spaced to accommodate the diameter of the roller 32 with a small predetermined clearance. This permits positive control of the amount of tilting of the pan 3 during discharge of the filter cake material. In the position of the middle tilted pan 3 in FIG. 13, the filter cake has been discharged and the middle pan is undergoing cleaning by spray nozzles which are located beneath the pan. The instantaneous rotational velocity W2 is indicated by the arrow in FIG. 13. In this position, the middle tilted pan 3 is being rotated away from its most inverted position (at which roller 32 would be in contact with cam surface 176 directly beneath the arrow X1) to a position which prevents collision between the trailing end of the filter pan 3 in the middle position with the trailing end of the adjacent tilted pan in the left-most tilted position shown in FIG. 13. Although no collision is possible at this point, the rotation of the middle tilted pan begins much sooner than necessary in order to minimize the stresses on the parts which would otherwise be greatly increased due to a sudden rotational acceleration caused by the cam surface. In the present invention, the rotational accelerations are maintained at a relatively low, constant rate consistent with minimizing the distance traveled by the axis 100 of each pan 3 occuring with tilting of the filter pans. This is advantageous in that, during the tilting portion of the pan cycle, no slurry is being filtered. Therefore, to increase plant capacity, the portion of path travel during which each pan 3 is tilted, is minimized consistent with the necessity of discharging filter cake and cleaning residual filter cake clinging to the underside of the pans.

The left-most tilted filter pan is rotating an angular velocity W1 in FIG. 13. The pan is being returned by contact of roller 31 with cam surface 175, to an upright position. The leading and left-most pan 3 is shown as being returned to its upright position, with the leading roller 32 again contacting the upper cam surface 170 which continues about the circular cam path and is continuous with the cam surface 170 at the right-most portion of FIG. 13.

In FIG. 13, the lower cam surface 173 contacts the roller 31 during most of the cam path. The roller 31 actually encounters a much lower force compared to the roller 32, since the center of gravity is now to the left of the axis of rotation 100 due to the inversion of the filter pan 3 during this portion of the cam path. Thus, the direction of the moment arm caused by the offset center of gravity in the middle pan 3 is in the same direction as the arrow labeled W2 in FIG. 13. Thus, the cam surface 176 bears almost the entire force needed to maintain a moment opposite to and equal in magnitude to the moment of the center of gravity of the empty filter pan 3. The magnitude of this force is much lower than that borne by the cam surface 170, since the cam surface 170 must maintain a moment arm against the weight of a filter pan 3 which is full of filter cake. The weight of filter cake can be in the range of 500-2000 pounds under typical operating conditions, while the weight of each pan empty is much less than the weight of a filter pan 3 which is full of filter cake.

Figure 14:
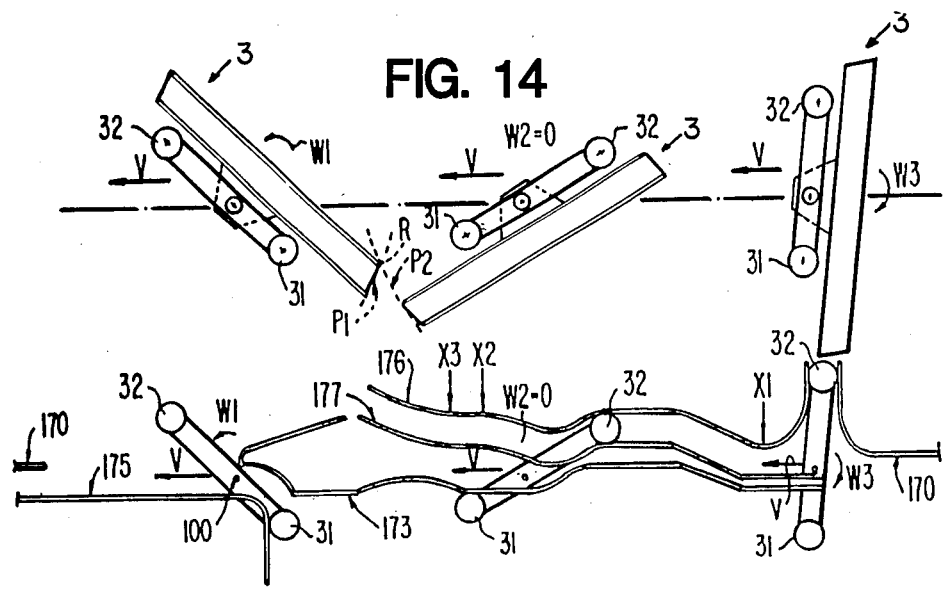
FIG. 14 is a view similar to that shown in FIG. 13, with the pans rotated to avoid a collision.

FIG. 14 is an end schematic view showing filter pan travel along the cam surfaces, similar to that shown in FIG. 13. In FIG. 14, only pans being tilted are shown. The potential collision point R is indicated at the intersection of dotted lines P1 and P2, illustrating the location of the middle pan just as it is about to undergo an angular acceleration. The parallel straight portions of the paths 176, 177, and 173 having been traversed by the respective rollers 32, 31, the middle pan in FIG. 14 has an instantaneous angular velocity W2 of approximately zero. FIG. 14 represents the left-most pan 3 and the middle pan 3 in a position wherein the left-most pan 3 has cleared rotation of its large end (the largest pan end, shown in FIG. 14, as opposed to the small pan end which is illustrated in FIG. 5 as pan end 26) relative to the nearest pan end of the middle tilted pan 3 seen in FIG. 14.

In FIG. 14, the left-most tilted pan is being rotated at instantaneous angular rotational velocity W1. The right-most tilted pan end has just passed the dead center of the first turnover location and has rotated through an angle of just over 90°. In this position, the center of gravity of the right-most pan 3 is still to the right of the axis of rotation 100. Thus, the roller 32 is supported by the cam surface 170. In the position of the middle tilted pan in FIG. 14, the center of gravity of the middle tilted pan is to the left of the axis of rotation 100, and therefore the upper cam surface 176 bears the force required to maintain a rotational moment of the roller 32 against the weight of the pan 3. The left-most pan 3 in FIG. 14 is shifted so that the center of gravity again lies to the right of the axis of rotation 100. Thus, the cam surface 175 abuts the roller 31 and supports the force necessary to maintain the moment arm required to support the pan 3 at roller 31 against the moment due to the center of gravity.

Figure 15:
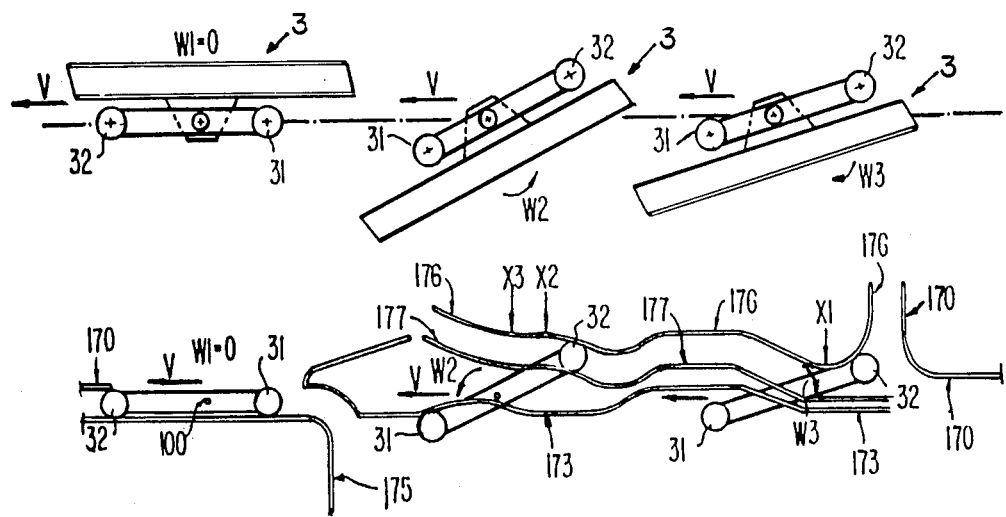
FIG. 15 is a view similar to that shown in FIG. 13, with the pan rotated further along the cam path.

FIG. 15 is a schematic view similar to FIG. 14, showing each of the pans 3 of FIG. 14 advanced in the direction of linear velocity V. In FIG. 15, the left-most pan 3 is again vertical and the roller 32 has come into contact again with cam 170. The left-most pan 3 has a rotational angular velocity of 0 in the position shown in FIG. 15. The middle pan 3 has an instantaneous rotational velocity W2 as indicated by the arrow in FIG. 15. In this figure, the middle pan roller 32 is nearing a location X2. The right-most pan 3 has roller 32 approaching the location X1. At the location X1, the pan 3 is inverted to its maximum tilt angle of 173° from the upright position. Complete inversion through 180° has been found to be unnecessary to completely discharge the filter cake from the pan 3, and the spray nozzles, discussed hereunder, used for cleaning the spray pans in the inverted position do not require the pan to be completely inverted. The right-most pan 3 in FIG. 15 has roller 32 abutting the cam surface 176, due to the center of gravity of the empty pan now being to the left of the rotational axis 100, due to the inversion of the pan. Thus, the weight of the pan causes the roller 32 to move upwardly and into engagement with the cam surface 176. The roller 31 in FIG. 15 for the right-most pan 3 does not contact the cam surface 173. Nonetheless, the cam surface 173 is provided in case of vibrational rotation, and rotation due to other causes to prevent the pan 3 from rotating completely freely, but rather keeping the pan 3 within a predetermined range of rotational movement.

Figure 16:
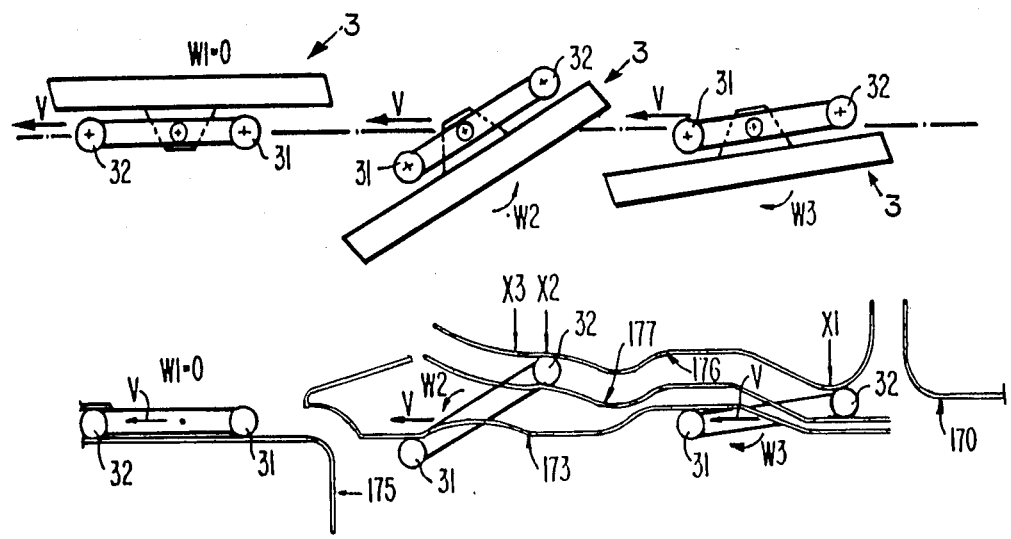
FIG. 16 is a view similar to that shown in FIG. 13, with the pan rotated at a critical location X2.

FIG. 16 is a schematic view similar to FIG. 15, with the middle tilting pan 3 having roller 32 moved to the location X2. In the location X2, the rollers 31, 32 are at an angle of 32° to the horizontal, measured in a counterclockwise direction from the horizontal, to a line connecting the center points of the rollers 31, 32 respectively. This angle is the smallest angle possible while preventing collision with the trailing edge wall of the rightmost pan 3 as it is nearing the maximum inversion achieved, and the right-most roller 32 is spaced only a small distance from the location X1, wherein the pan 3 would be at its maximum inversion of 172.6°.

Figure 17:
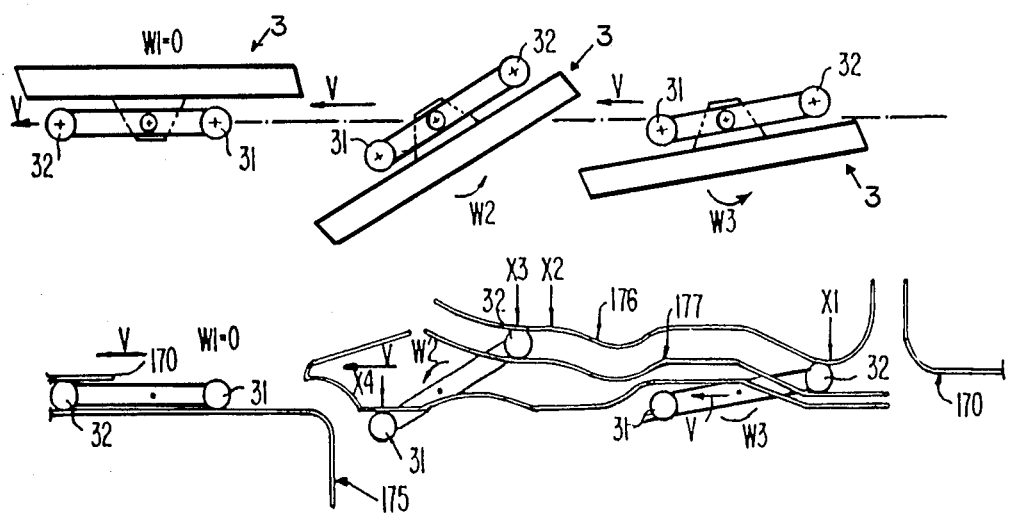
FIG. 17 is a view similar to that shown in FIG. 13, with the pan rotated at a cricital location X3.

FIG. 17 is a schematic view similar to FIG. 16, with the middle tilted pan having roller 32 at the location X3. At location X3, the angle of tilt of the middle pan 3 is the same as the angle of tilt of the middle pan 3 shown in FIG. 16, namely 32°. As seen in FIG. 17, the rightmost pan has roller 32 which is just passed the location X1, and is slightly passed the location of maximum inversion.

Figures 18, 19:
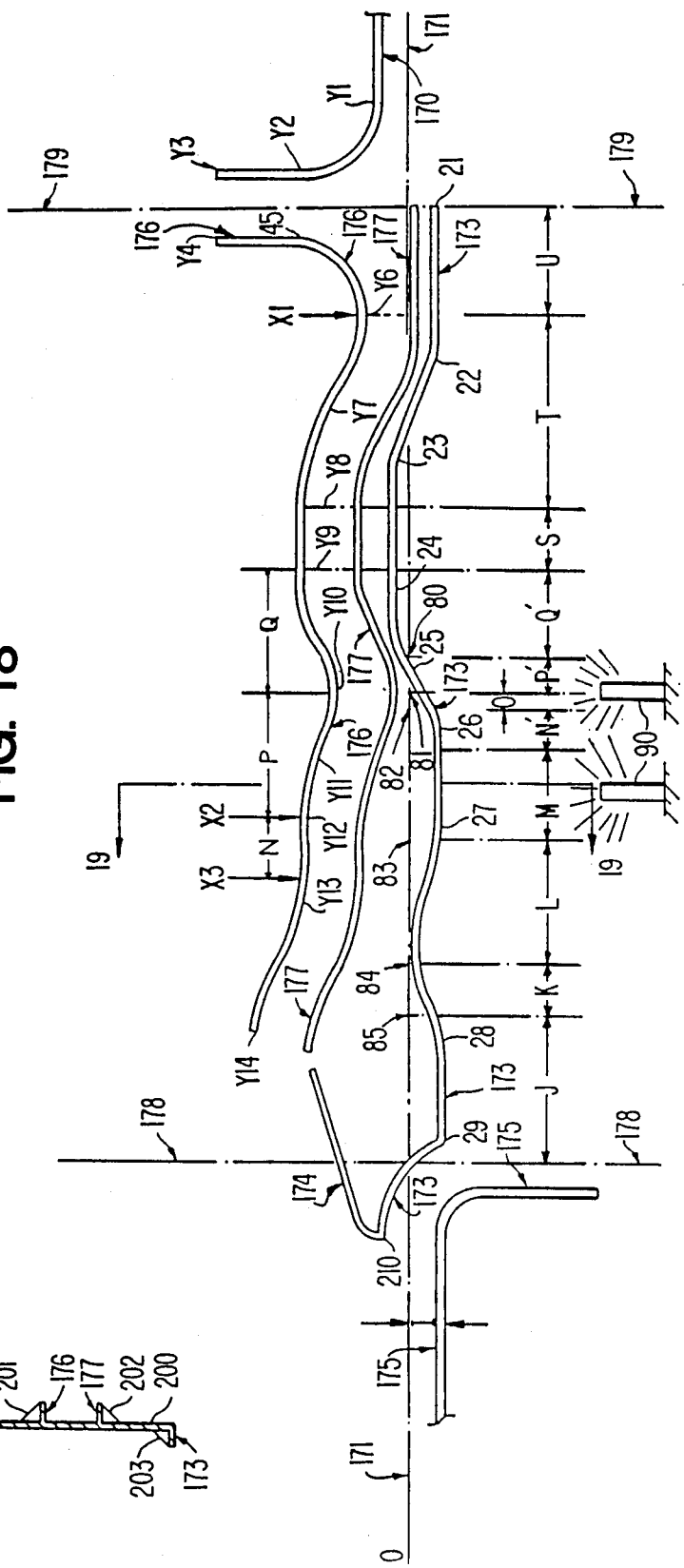
FIG. 18 is an enlarged view of the portion of the cam arrangement causing inversion and subsequent return of the pans.
FIG. 19 is a side sectional view of the cam structure as taken along line 19—19 of FIG. 18.

FIG. 18 is an enlarged elevational view of the cam arrangement used in the present invention, with the dimensions being converted from the cylindrical coordinates to planar coordinates in a manner well-known similar to the rolling of a cam along a plane surface so as to peel off a label thereon. Thus, the cam arrangement shown in FIG. 18 would actually lie along the radius of a circle of approximately 385⅞ inches in radius. The inner-most portion of the upper cam surface 176 and the cam surface 177 lie at a radius of approximately 382⅝ inches, and the outer-most position of the lower-most cam surface 173 lies at a radius of 389¼ inches.

The line 171, shown in dashed form in FIG. 18, shows the path followed by the axis of rotation 100 of each of the pans. Several locations have been indicated along this center line illustrating critical locations as follows.

At location 80 along the pan axis centerline 171, the filter pan 3 completes its rotation for achieving a final tilted position which avoids collision with the leading filter pan and places the trailing side of the pan close to the spray beneath. At location 80, the filter pan 3 overlies spray headers 90. At location 81, the rotation of the pan has achieved sufficient tilting so that the "little" end, namely end 26, has cleared an angular position wherein collision would be possible, so that collision is avoided. During pan axis travel between the points 80, 81 the regions corresponding to the cam path in contact with the wheels 31, 32 are horizontal so that a constant angular acceleration equal to zero is achieved.

At point 82, the "big" end, end 27, has cleared an angular inclination such that no collision is possible between a pan having a rotational axis 100 coinciding with point 82, and a leading pan adjacent to it. At this location, the filter pan 3 is being cleaned by the spray headers which wash out the corners of any filter cake remaining in the pan, and also wash the center of the pan free of any clinging filter cake.

At point 83, the filter pan 3 is tilted as far upsidedown as the pan will get between the points 80 and 85 in order to place the leading side of the pan closer to the spray. At this angle, the leading side of the filter pan 3 is being cleaned by the spray headers 90.

At point 84, the pan 3 is rotated 148° from its upright position, and lies at a 32° degree angle from the centerline 171 in order to avoid collision with the trailing pan which is at the point of maximum inversion. At this point 84, a rear wheel 32 of the pan 3 is at the location X2. Similarly, at point 85 the filter pan 3 is also at an angle of 32° from the centerline 171, corresponding to a 148° pan rotation. At this location, point 85, the wheel 32 would be in contact with the point X3 on the cam surface 176.

Line 178 represents the vertical centerline of the pan rotational axis 100 when the pan is exactly vertical. Similarly, the line 179 is the vertical centerline of the rotational axis 100 of a pan when in a completely vertical position between the cam surfaces 176 and 170. The arc length between the centerline 178, 179 in the preferred embodiment is 139.75 inches in length, at a radius from the pan travel center of 385⅞ inches.

In the preferred embodiment, the distance from vertical centerline 179 to point X1 is approximately 16.53 inches indicated by dimension U. Point X1 is the location of wheel 32 when the pan has reached a point of maximum inversion of 172.6° to allow complete discharge of the cake.

The distance indicated as T, the horizontal distance between point X1 and point Y8, is 27.37 inches. Point Y8 is the location of wheel 32 when the pan has been rotated to 148° in order to avoid collision with the leading pan which is returning to the upright position. This attitude is maintained for 9¾ inches, indicated as dimension S between points Y8 and Y9.

The distance indicated by Q, the horizontal distance between Y9 and Y10, is 15.6 inches. Point Y10 is the position of wheel 32 when the pan has been rotated to 162° in order to move the leading side of the pan closer to the spray header.

The distance indicated by P, the horizontal distance between Y10 and X2, is 20.4 inches. Point X2 is the position of wheel 32 when the pan has been rotated to 148° from the upright position in order to prevent collision with the trailing pan which is approaching the point of maximum inversion. This attitude is maintained for 7.9 inches, indicated as dimension N between points X2 and X3.

Return of the pan to the upright position is then accomplished by the cam surfaces 177 and 175 to the left of point X3. A smooth transition is provided where wheel 32 reaches the terminus of cam 177 and coincidentally wheel 31 contacts cam surface 175 by matching the angular velocity of the pan imposed by the two cam surfaces at that point.

Between any two locations along any cam surface shown in FIG. 18, the angular acceleration has been minimized, taking into account the constraints requiring that no collisions occur and the constraints requiring inversion and return to an upright position of the pans 3 and the constraints requiring a minimum distance between the pan filter media 16 and the sprays. The optimization of the pan tilting is with regard to the distance traveled along the centerline 171. Thus, the entire pan tilting operation, with due regard for the above-mentioned constraints, is optimized so that a minimum length of travel of the axis 100 of each pan 3 occurs along the centerline 171.

FIG. 19 is a sectional view taken along line 19—19 of FIG. 18. Here, the cam surface 176 is seen as a horizontal plate, preferably made of steel, aluminum, or other material sufficiently strong to support the force required against the moment arm to cause rotation and maintain equilibrium as required. The cam surface 176 is braced by a support 201, which may be welded or otherwise connected to the opposite side of the plate having surface 176 thereon. The support 201 is preferably also welded to the plate 200 which forms a cylindrical body having a radius at 385⅝ inches. The plate having cam surface 176 is preferrably welded or otherwise attached to plate 200. Similarly, the cam surface 177 is connected to the plate 200 by welding, riveting, or other attachment and by supports 202 which are welded, riveted, or otherwise attached between the plate 200 and the cam plate having surface 177. Likewise, the cam surface 173 on FIG. 19 is attached to the opposite side of the plate 200 and has supports 203 thereon. Preferably, a plurality of such supports 201, 202, and 203 are used for supporting respective cam surfaces. The right-most location of the cam surface 176 is a radius of 382⅝ inches, and the left-most extent of the cam surface 173 is approximately 389⅛ inches. The vertical distance between cam surfaces 176 and 177 is 8⅛ inches.

Spray headers 90 are angled to clean the pans from the first point at which the filter cake is discharged until the pan axis 100 reaches location 85. If desired, additional spray headers can be added to continue to clean the pan beyond the location 85, and until the pan reaches its vertical position. Beyond the vertical position, any additional spray water added would be required to be removed from the pan through the filter. Although this is not desirable in the present invention, such additional cleaning can be used and such variations are contemplated as being within the scope of the present invention.

The improved filter pan and cam arrangement of the present invention is capable of achieving the above-described advantages and results, and while preferred embodiments of the present invention have been disclosed, it will be understood that it is not limited thereto but may otherwise embodied within the scope of the following claims.

What is claimed is:

1. A control device for a filter pan for use in a continuous filter system to discharge filter cake, wherein each filter pan has:
   (i) a pan body having a tilt axis, a first end wall, a second end wall, a leading side wall and a trailing side wall forming an enclosure for retaining particulate material above a filtering medium wherein a cross-section of said filter pan is a parallelogram;
   (ii) a liquid collection region for collecting liquid filtered by said filtering medium;
   (iii) an outlet for liquid collected by said filtering medium; and
   (iv) an axis of rotation, said leading side wall being oriented at an angle of at least 8° to the direction of travel of said leading side wall, said trailing side wall being disposed at said angle to the direction of travel of said trailing side wall, comprising:
   a first cam surface being in contact with a leading cam-contacting element on a tilting filter pan;
   a second cam surface disposed beneath said first cam surface said second cam surface being in contact with a leading cam-contacting element on a tilting filter pan;
   a third cam surface being in contact with a trailing cam-contacting element on a tilting filter pan;
   said first cam surface having a pan inversion region, a pan return region for rotating a pan to avoid collision with an adjacent leading pan, a pan advance region for rotating a pan back toward an inverted position following clearing of a leading pan, and a pan tighting region for rotating the pan to an upright position;
   said second cam surface cooperating with said first cam surface and being generally parallel thereto;
   said third cam surface having a pan inversion region, a pan return region for rotating a pan to avoid collision with an adjacent leading pan, a pan advance region for rotating a pan back toward an inverted position following clearing of a leading pan, and a pan righting region;
   whereby a plurality of pans are rotated simultaneously by said first, said second, and said third cam surfaces such that each rotated pan is in a different stage of rotation, such that filter cake is discharged from each pan consecutively and the pans are righted consecutively without collisions between adjacent pans.

2. A control device for a filter pan as claimed in claim 1, further comprising a means for rinsing a portion of each filter pan following inversion of the pan and discharge of the filter cake.

3. A control device for a filter pan as claimed in claim 1, further comprising:
   a main cam section for maintaining each said pan in an upright position during filtering of slurry in each pan;

said main cam section having an inversion region cooperating with said inversion region of said first cam surface to invert a pan;
a fourth cam section having a pan righting region cooperating with said pan right region of said first cam surface and with said pan righting region of said third cam surface to right an inverted pan.

4. A control device for a filter pan as claimed in claim 1, wherein said first and said second cam surfaces are in contact with a leading cam-contacting element on a tilting filter pan and retain said leading cam-contacting element therebetween.

5. A control device for a filter pan as claimed in claim 4, wherein said leading cam-contacting element is a roller which rotates while in contact with a cam surface.

6. A control device for a filter pan as claimed in claim 1, wherein said third cam surface is in contact with a trailing cam-contacting element on a tilting filter pan.

7. A control device for a filter pan as claimed in claim 6, wherein said trailing cam-contacting element is a roller which rotates while in contact with a cam surface.

8. A control device for a filter pan as claimed in claim 1, wherein said first cam surface is continuous;
said second cam surface is continuous, and said third cam surface is continuous.

9. A pan tilting apparatus as claimed in claim 8, further comprising means for rinsing pans following discharge of filter cake during inversion of the pan.

10. A control device for a filter pan as claimed in claim 1, wherein said first, second, and third cam surfaces are shaped to provide constant angular acceleration of the pan during rotation from said inversion region of each of said first, second, and third cam surfaces to said pan return region of each of said first, second, and third cam surfaces.

11. A pan tilting apparatus for use in a continuous filter system having closely spaced pans, for discharge of filter cake, wherein each filter pan has:
(i) a pan body having a tilt axis, a first end wall, a second end wall, a leading side wall and a trailing side wall forming an enclosure for retaining particulate material above a filtering medium wherein a cross-section of said filter pan is a parallelogram;
(ii) a liquid collection region for collecting liquid filtered by said filtering medium;
(iii) an outlet for liquid collected by said filtering medium;
(iv) an axis of rotation, said leading side wall oriented at an angle of at least 8° to the direction of travel of said leading side wall, said trailing side wall being disposed at said angle to the direction of travel of said trailing side wall, and
(v) a control device for a filter pan, each pan having a leading cam-contacting element and a trailing cam-contacting element for tilting the pan, comprising:
a cam assembly having a pan inversion region to invert a pan to discharge filter cake, contacting one of said cam-contacting elements to cause inversion of the pan about its tilt axis;
said assembly having a pan return region for returning a pan through an angular rotation to move it out of a collision path of a leading adjacent pan;
said cam assembly having a pan advance region for rotating a pan back toward an inverted position following clearing of a leading adjacent pan; and
said assembly having a pan righting region for returning the pan to an upright position in a reverse angular direction to that followed during pan inversion;
whereby said cam assembly causes a plurality of filter pans to undergo different stages of rotation simultaneously without collision.

12. A pan tilting apparatus as claimed in claim 11, wherein said cam assembly has cam surfaces shaped to provide a constant angular acceleration to the pan during tilting rotational movement from said inversion region to said pan return region, from said pan return region to said pan advance region, and from said pan advance region to said righting region.

13. A pan tilting apparatus as claim in claim 11, wherein said cam assembly has cam surfaces shaped to guide a pan during rotational movement about its tilt axis at a constant angular acceleration in moving from one angular inclination to another;
whereby stresses due to rotational acceleration are minimized, and whereby pan travel time during discharge of filter cake is minimized.

14. A continuous filter system for filtering a slurry and discharging filter cake, comprising in combination;
a plurality of filter pans mounted for traveling along a closed path;
a means for moving said plurality of filter pans along said closed path;
each of said plurality of filter pans having a leading cam-contacting element and a trailing cam-contacting element;
a cam assembly to tilt each of said plurality of filter pans sequentially;
each of said plurality of filter pans having:
(i) a leading side wall, a trailing side wall, a first end wall, and a second end wall forming an enclosure for retaining poarticulate material above a filtering medium wherein said filter pan is a parallelogram;
(ii) a liquid collection region for collecting liquid filtered by said filtering medium;
(iii) an outlet for liquid collected by said filtering medium; and
(iv) an axis of rotation;
said leading side wall being generally planar;
said trailing side wall being generally planar;
said leading side wall being oriented at an angle of at least 8° to the direction of travel of said leading side wall;
said trailing side wall being disposed at said angle to the direction of travel of said trailing side wall;
a pan inversion region to invert a pan to discharge filter cake, contacting one of said cam-contacting elements to cause inversion of the pan about its tilt axis;
said cam assembly having a pan return region for returning a pan through an angular rotation to move it out of a collision path of a leading adjacent pan;
said cam assembly having a pan advance region for rotating a pan back toward an invereted position following clearing of a leading adjacent pan; and
said cam assembly having a pan righting region for returning the pan to an upright position in a reverse angular direction to that followed during pan inversion;
whereby said cam assembly causes a plurality of filter pans to undergo different stages of rotation simultaneously without collision.

15. A continuous filter system as claimed in claim 14, wherein adjacent ones of said plurality of filter pans are closely spaced, such that a possibility of collision exists between adjacent ones of said plurality of filter pans during simultaneous tilting thereof.

16. A continuous filter system as claimed in claim 14, wherein said closed path generally comprises a circular path.

17. A continuous filter system as claimed in claim 14, wherein said angle is approximately 15°.

18. A continuous filter system as claimed in claim 14, wherein each one of said plurality of filter pans includes a pan body and a filtering medium supported by said pan body to filter particulate material from a slurry.

19. A continuous filter system as claimed in claim 14, further comprising a means for rinsing pans following discharge of filter cake during inversion of the pan.

20. A continuous filter system as claimed in claim 14, wherein said cam assembly has cam surfaces shaped to guide a pan during rotational movement about its tilt axis at a constant angular acceleration in moving from one angular inclination to another;

whereby stresses due to rotational acceleration are minimized, and whereby pan travel time during discharge of filter cake is minimized.

* * * * *